United States Patent
Lee et al.

(10) Patent No.: US 10,354,124 B2
(45) Date of Patent: Jul. 16, 2019

(54) ELECTRONIC APPARATUS AND CONTROLLING METHOD FOR IMPROVE THE IMAGE QUALITY PREFERENCE OF SKIN AREA

(71) Applicant: SAMSUNG ELECTRONICS CO., LTD., Suwon-si, Gyeonggi-do (KR)

(72) Inventors: Min-jae Lee, Suwon-si (KR); Myoung-koo Choi, Incheon (KR); You-young Jung, Yongin-si (KR); Jeong-woon Eom, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 49 days.

(21) Appl. No.: 15/375,637

(22) Filed: Dec. 12, 2016

(65) Prior Publication Data

US 2017/0213073 A1    Jul. 27, 2017

(30) Foreign Application Priority Data

Jan. 27, 2016    (KR) ........................ 10-2016-0009872

(51) Int. Cl.
*G06K 9/00*    (2006.01)
*G06K 9/46*    (2006.01)
(Continued)

(52) U.S. Cl.
CPC ..... *G06K 9/00281* (2013.01); *G06K 9/00221* (2013.01); *G06K 9/4652* (2013.01);
(Continued)

(58) Field of Classification Search
None
See application file for complete search history.

(56) References Cited

U.S. PATENT DOCUMENTS 8,525,847 B2    9/2013    Reid et al.
8,849,025 B2 *  9/2014    Kim ..................... G06T 11/001
                                                              382/167
(Continued)

FOREIGN PATENT DOCUMENTS

JP    2013-046374    3/2013
JP    2013-131077    7/2013
(Continued)

OTHER PUBLICATIONS

Search Report and Written Opinion dated Apr. 11, 2017 in counterpart International Patent Application No. PCT/KR2016/015377.
(Continued)

*Primary Examiner* — Bernard Krasnic
(74) *Attorney, Agent, or Firm* — Nixon & Vanderhye P.C.

(57) ABSTRACT

An electronic apparatus is provided. The electronic apparatus includes an input comprising input circuitry configured to receive an image and a processor configured to detect a skin area from the image to acquire information on a pixel value of a pixel included in the skin area, to acquire information on characteristics of the skin area based on a face area in the skin area, and to process image quality of the skin area based on the information on the pixel value and the information on the characteristics of the skin area. As a result, it is possible to reduce the image distortion of the skin area occurring when only the analysis of the quantitative elements is performed and to improve the image quality preference of the skin area based on the analysis of the qualitative elements in addition to the quantitative elements.

16 Claims, 15 Drawing Sheets

(51) Int. Cl.
 G06T 7/90 (2017.01)
 G06T 7/11 (2017.01)
 G06T 7/00 (2017.01)
 H04N 1/62 (2006.01)

(52) U.S. Cl.
 CPC ............ G06T 7/0002 (2013.01); G06T 7/11 (2017.01); G06T 7/90 (2017.01); H04N 1/628 (2013.01); *G06K 2009/00322* (2013.01); *G06K 2009/00328* (2013.01)

(56) References Cited

U.S. PATENT DOCUMENTS

| | | | |
|---|---|---|---|
| 2001/0035988 A1* | 11/2001 | Semba | H04N 1/60 358/518 |
| 2007/0031033 A1* | 2/2007 | Oh | G06K 9/00228 382/167 |
| 2007/0133024 A1* | 6/2007 | Kang | G06T 11/001 358/1.9 |
| 2007/0154084 A1* | 7/2007 | Kang | H04N 1/6052 382/162 |
| 2009/0273667 A1 | 11/2009 | Nozaki et al. | |
| 2010/0026831 A1 | 2/2010 | Ciuc et al. | |
| 2010/0039525 A1 | 2/2010 | Steinberg et al. | |
| 2012/0257826 A1 | 10/2012 | Kim et al. | |
| 2013/0051633 A1 | 2/2013 | Okamoto | |
| 2013/0314581 A1 | 11/2013 | Kido | |
| 2015/0170377 A1 | 6/2015 | Thomas et al. | |
| 2015/0332345 A1* | 11/2015 | Lynar | G06Q 30/0271 705/14.67 |

FOREIGN PATENT DOCUMENTS

| | | |
|---|---|---|
| KR | 10-2009-0113075 | 10/2009 |
| KR | 10-1446975 | 10/2014 |

OTHER PUBLICATIONS

Extended European Search Report for EP Application No. 16888324.7 dated Sep. 12, 2018.

* cited by examiner

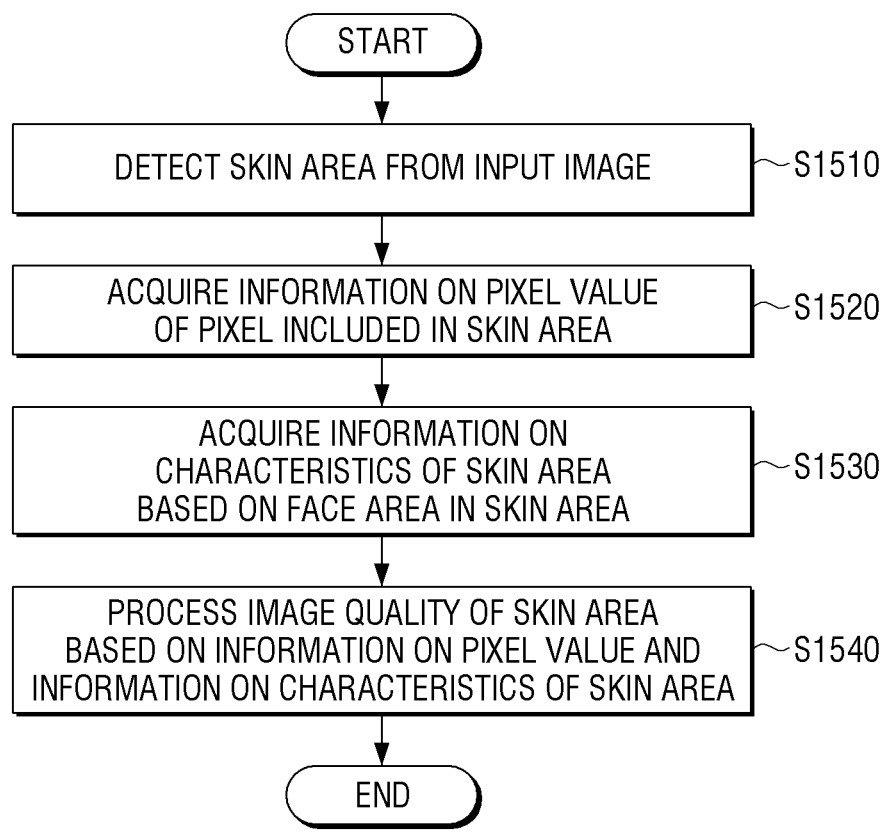

ELECTRONIC APPARATUS AND CONTROLLING METHOD FOR IMPROVE THE IMAGE QUALITY PREFERENCE OF SKIN AREA

CROSS-REFERENCE TO RELATED APPLICATION

This application is based on and claims priority under 35 U.S.C. § 119 to Korean Patent Application No. 10-2016-0009872, filed on Jan. 27, 2016 in the Korean Intellectual Property Office, the disclosure of which is incorporated by reference herein in its entirety.

BACKGROUND

Field

The present disclosure relates generally to an electronic apparatus and a controlling method thereof, and for example, to an electronic apparatus and a controlling method thereof capable of performing image processing of a digital image.

Description of Related Art

With the development of an electronic technology, various types of electronic products have been developed and widely distributed. Particularly, various display apparatuses such as a television (TV), a mobile phone, a personal computer (PC), a laptop computer, and a personal digital assistant (PDA) have been mostly used even in most homes.

As the use of display apparatuses is increased, user needs for various functions have increased. In particular, with the constant development of technologies for improvement in the image processing of the display apparatus, various attempts for image processing have been conducted.

In detail, the related art has widely used a method for separating a skin area from a digital image based on features of a face such as eyes, a nose, and a mouth, color features such as chromaticity, saturation, and brightness, or the like to separately perform image processing from background.

As such, the reason for separately performing image processing from the skin area is that a skin color is a color that persons come into contact most frequently in our daily lives and thus sensitively react to a slight change in skin color as opposed to a change in colors of other objects.

Conventionally, however, the image processing for the skin area is based on quantitative elements, such as chromaticity, brightness, and saturation, for pixels of the skin area. However, a demand to perform various types of image processing in consideration of qualitative elements in addition to the quantitative elements has been increased.

SUMMARY

Example embodiments of the present disclosure address the above disadvantages and other disadvantages not described above.

The present disclosure provides an electronic apparatus and a controlling method thereof capable of performing image processing on a skin area by analyzing qualitative elements and quantitative elements for a skin area.

According to an example aspect of the present disclosure, an electronic apparatus includes: an input comprising input circuitry configured to receive an image; and a processor configured to detect a skin area from the image to acquire information on a pixel value of a pixel included in the skin area, to acquire information on characteristics of the skin area based on a face area in the skin area, and to process image quality of the skin area based on the information on the pixel value and the information on the characteristics of the skin area.

The information on the characteristics of the skin area may include information on at least one of: a sex, an age, a race, and an area about the skin area.

The information on the pixel value may include information on at least one of: color, saturation, contrast, brightness, and color temperature.

The electronic apparatus may further include: a storage configured to store information on skin color preference of a user, in which the processor may determine a skin color corresponding to the information on the characteristics of the skin area among the information on the skin color preference and process the image quality of the skin area depending on the determined skin color.

The electronic apparatus may further include: a communicator comprising communication circuitry configured to perform communication with an external server, wherein the processor may control the communication circuitry of the communicator to receive the information on the skin color preference of the user from the external server.

The processor may detect at least one of: a sex, an age, a race, and an area about the skin area based on at least one object included in a face area in the skin area.

The electronic apparatus may further include: an imager comprising imaging circuitry configured to photograph an image of a user, wherein the processor may acquire the information on the characteristics of the skin area of the user based on the face area of the image of the user, determine the skin color preference of the user based on the information on the characteristics of the skin area of the user, and process the image quality of the skin area included in the image based on the determined preference.

The processor may gradually process the image quality of the skin area for a plurality of preset frame intervals.

The electronic apparatus may further include: a display, wherein the processor may control the display to display an image in which the image quality of the skin area is processed.

According to another example aspect of the present disclosure, a method of controlling an electronic apparatus includes: detecting a skin area from an input image; acquiring information on a pixel value of a pixel included in the skin area; acquiring information on characteristics of the skin area based on a face area in the skin area; and processing image quality of the skin area based on the information on the pixel value and the information on the characteristics of the skin area.

The information on the characteristics of the skin area may include information on at least one of: a sex, an age, a race, and an area about the skin area.

The information on the pixel value may include information on at least one of: color, saturation, contrast, brightness, and color temperature.

In the processing of the image quality of the skin area, a skin color corresponding to the information on the characteristics of the skin area among pre-stored information on skin color preference of a user may be determined and the image quality of the skin area may be processed depending on the determined skin color.

The method may further include: receiving the information on the skin color preference of the user from an external server.

In the acquiring of the information on the characteristics of the skin area, at least one of: a sex, an age, a race, and an area about the skin area may be detected based on at least one object included in a face area in the skin area.

The method may further include: photographing an image of a user; acquiring information on the characteristics of the skin area of the user based on a face area in the image of the user; determining the skin color preference of the user based on the information on the characteristics of the skin area of the user; and processing the image quality of the skin area included in the image based on the determined preference.

In the processing of the image quality of the skin area, the image quality of the skin area may be gradually processed for a plurality of preset frame intervals.

The method may further include: displaying an image in which the image quality of the skin area is processed.

As described above, according to various example embodiments of the present disclosure, it is possible to reduce the image distortion of the skin area occurring when only the analysis of the quantitative elements is performed and improve the image quality preference of the skin area based on the analysis of the qualitative elements.

BRIEF DESCRIPTION OF THE DRAWINGS

The above and/or other aspects of the present disclosure will be more readily apparent from the following detailed description, taken in conjunction with the accompanying drawings, in which like reference numerals refer to like elements, and wherein:

FIG. 15 is a flowchart illustrating an example method of controlling an electronic apparatus according to an example embodiment of the present disclosure.

DETAILED DESCRIPTION

Hereinafter, example embodiments of the present disclosure will be described in greater detail with reference to the accompanying drawings.

Figure 1:
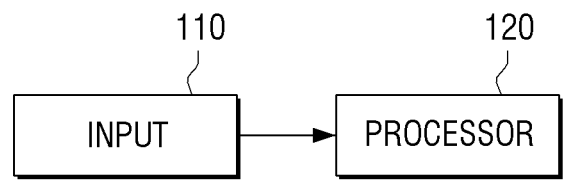
FIG. 1 is a block diagram illustrating an example configuration of an electronic apparatus according to an example embodiment of the present disclosure.

FIG. 1 is a block diagram illustrating an example configuration of an electronic apparatus according to an example embodiment of the present disclosure.

Referring to FIG. 1, an electronic apparatus 100 includes an input (e.g., including input circuitry) 110 and a processor (e.g., including processing circuitry) 120.

So long as the electronic apparatus 100 is an apparatus that may perform an image processing function on an image, any electronic apparatus may be used without limitation. For example, the electronic apparatus 100 may be implemented by various types of electronic apparatus such as a television (TV), an electronic board, an electronic table, a large format display (LFD), a smart phone, a tablet, a desktop PC, a notebook, a set top box, a smart watch, a wearable apparatus, or the like, but is not limited thereto.

The input 110 may include various input circuitry configured to receive an image. For example, the image may include a still image and a moving picture image and may be implemented by a document, a picture, a video, or the like, but is not limited thereto. Further, the input 110 may receive an image from external apparatuses by wireless or wired communications, may also receive an image from a storage (not illustrated) of the electronic apparatus 100, and receive an image from storages in which a plurality of images are stored, such as an USB memory, a CD, and external hard disk drives.

The processor 120 may include various processing circuitry configured to detect a skin area from an image to obtain information on a pixel value of a pixel included in the skin area.

For example, the processor 120 may detect the skin area recognized a human skin from the image input through the input 110. A technology of detecting the skin area recognized as the human skin from the image may refer, for example, to a technology of detecting a skin area by comparing a plurality of pre-stored images associated with the human skin with a color, a shape, or the like. The technology is already known and therefore the detailed description thereof will be omitted.

Further, the processor 120 may acquire the information on the pixel value of the pixel included in the detected skin area. For example, the information on the pixel value may include information on at least one of color, saturation, contrast, brightness, and color temperature. The color, saturation, contrast, brightness, and color temperature may be digitalized and the information that may be digitalized is defined as quantitative information.

For example, the processor 120 may obtain the quantitative information such as the color, saturation, contrast, brightness, and color temperature of the skin area based on the pixel value of the pixel included in the detected skin area. Further, the information on the pixel value may include all information associated the skin area that may be digitalized, in addition to the foregoing components.

Further, the processor 120 may obtain information on characteristics of the skin area based on a face area in the skin area.

For example, the processor 120 may detect the face area in the skin area and may detect the face area by comparing, for example, a plurality of pre-stored images of the face shape.

Further, the information on the characteristics of the skin area may include the information on at least one of a sex, an age, a race, and an area about the skin area. The sex, age, race, and area are not information that may be digitalized like the pixel value and the information that may not be digitalized is defined as qualitative information.

For example, the processor 120 may detect at least one of the sex, the age, the race, and the area about the skin area based on at least one object included in the face area in the skin area.

For example, the processor 120 may determine the sex of the skin area based on a length of a hair, a shape of an eyebrow, a shape of a nose, a shape of a lip, a form of a face or the like that are included in the face area.

Further, the processor 120 may determine the race of the skin area based on a tone of a skin, a color of a pupil, or the like that are included in the face area.

Further, the processor 120 may analyze elements that may determine aging of a skin such as the number and a shape of wrinkles, presence and absence of pimples, presence and absence of black spots, or the like which are included in the face area, thereby determining the age of the skin area.

Further, the processor 120 may determine an area of a user using the electronic apparatus 100 based on user account information of the user using the electronic apparatus 100, setting information of the electronic apparatus 100, setting information on the external apparatus connected to the electronic apparatus 100, a used language set in the electronic apparatus 100 or the external apparatus connected to the electronic apparatus 100, or the like.

For example, the setting information of the electronic apparatus 100 may include information on a set value changed depending on a sales area of the electronic apparatus 100. Further, the user area may refer, for example, to countries or continents derived based on the foregoing information.

The process of obtaining the information on the characteristics of the skin area of the foregoing processor 120 may individually compare the plurality of images that are categorized and stored by sex, age, race, and area to determine the sex, age, race, and area of the skin area.

Further, the processor 120 may process an image quality of the skin area based on the information on the pixel value of the pixel included in the skin area and the information on the characteristics of the skin area. A more detailed description of the image processing will be described below.

Figure 2:
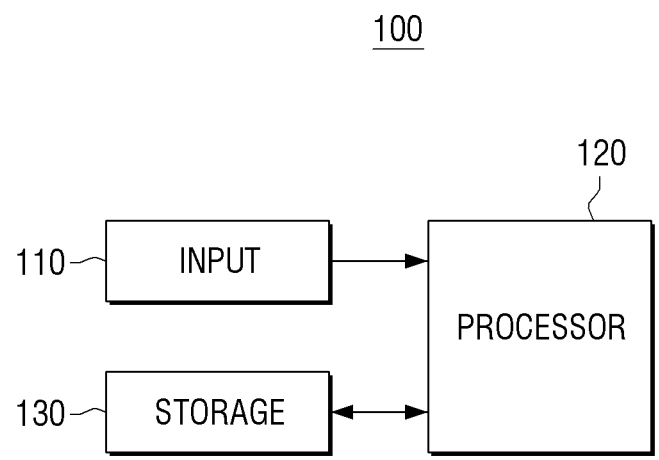
FIG. 2 is a block diagram illustrating an example configuration of an electronic apparatus according to another example embodiment of the present disclosure.

FIG. 2 is a block diagram illustrating an example configuration of an electronic apparatus according to another example embodiment of the present disclosure.

Referring to FIG. 2, the electronic apparatus 100 may include the input 110, the processor 120, and a storage 130.

The input 110 and the processor 120 are already described, and therefore a repeated detailed description thereof will be omitted.

The storage 130 stores the information on skin color preference of the user. For example, the information on the skin color preference of the user may refer, for example, to the information on the user preferred skin color by category such as the sex, the age, the race, the area, or the like.

For example, the information on the skin color preference of the user may include information like a user prefers a skin color of a bright color when the sex is a female, the age is twenties, the race is westerner, and the area is the United States of America.

Further, the information on the skin color preference of the user may include information like a user prefers a skin color of light brown when the sex is a male, the age is twenties, the race is Asian, and the area is Korea.

The information on the skin color preference of the user may be stored, for example, in a lookup table form.

For example, the processor 120 may determine the skin color corresponding to the information on the characteristics of the skin area among the information on the skin color preference and process the image quality of the skin area depending on the determined skin color.

For example, when the information on the characteristics of the skin area acquired by the processor 120 corresponds to the case in which the sex is a female, the age is thirties, and the race is Asian, the processor 120 may match the information on the foregoing characteristics of the skin area with the information on the skin color preference of the user to determine the skin color for the image processing.

For example, when the corresponding skin color is set to be light brown in the case in which the sex is a female, the age is thirties, and the race is Asian among the information on the skin color preference of the user, the processor 120 may perform the image processing for changing the skin color of the skin area of the input image to be light brown.

In this example, the processor 120 may perform the image processing for changing the skin color of the skin area of the input image to the determined skin color based on the information on the pixel value and the information on the characteristics of the skin area.

For example, the processor 120 may determine how to change the values of the color, the saturation, the contrast, the brightness, or the like among the information on the pixel value in consideration of the sex, the age, the race, the area, or the like that are the information on the characteristics of the skin area. A more detailed description thereof will be described below with the reference to the drawings.

The processor 120 may continuously update the information on the skin color preference of the user to provide big data. For example, the processor 120 may continuously update the information on the skin color preference of the user in consideration of a user input and a use history and may also store data about the change in the skin color preference of the user based on the user input and the use history.

Further, the processor 120 may also receive the information on the skin color preference of the user from the external apparatus and store the received information in the storage 130.

Figure 4:
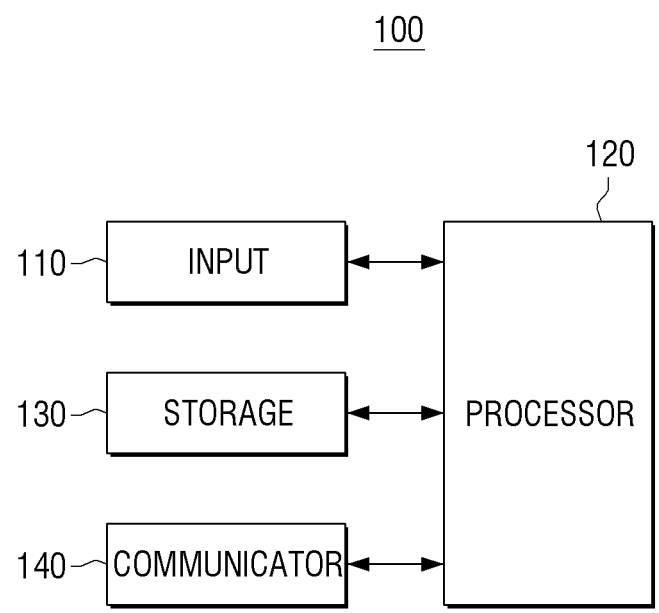
FIG. 4 is a block diagram illustrating an example configuration of an electronic apparatus according to another example embodiment of the present disclosure.

FIG. 4 is a block diagram illustrating an example configuration of an electronic apparatus according to another example embodiment of the present disclosure.

Referring to FIG. 4, the electronic apparatus 100 may include the input 110, the processor 120, the storage 130, and a communicator (e.g., including communication circuitry) 140. In this configuration, the input 110, the processor 120, and the storage 130 are already described, and therefore a repeated detailed description thereof will be omitted.

The communicator 140 may include various communication circuitry configured to perform communication with an external server. For example, the communicator 140 may perform the communication with the external server by various communication schemes such as Bluetooth (BT), wireless fidelity (WI-FI), Zigbee, infrared (IR), serial interface, universal serial bus (USB), and near field communication (NFC).

Further, the processor 120 may control the communicator 140 to receive the information on the skin color preference of the user from the external server.

For example, the information on the skin color preference of the user received from the external server may also include the information on the skin color preference of the user that is stored by being directly uploaded onto the external server by the user but may also include the information on the skin color preference that other third parties other than the user prefer, in addition to the user of the corresponding electronic apparatus 100.

Further, the external server may also provide a skin color recommendation service in consideration of the age, the sex, the area, or the like of the user using the corresponding electronic apparatus 100 by storing and databasing the information on the skin color preference of the third party other than the user using the corresponding electronic apparatus 100 and the electronic apparatus 100 may automatically perform the image processing based on the skin color recommendation service received from the external server through the communicator 140.

Figure 3:
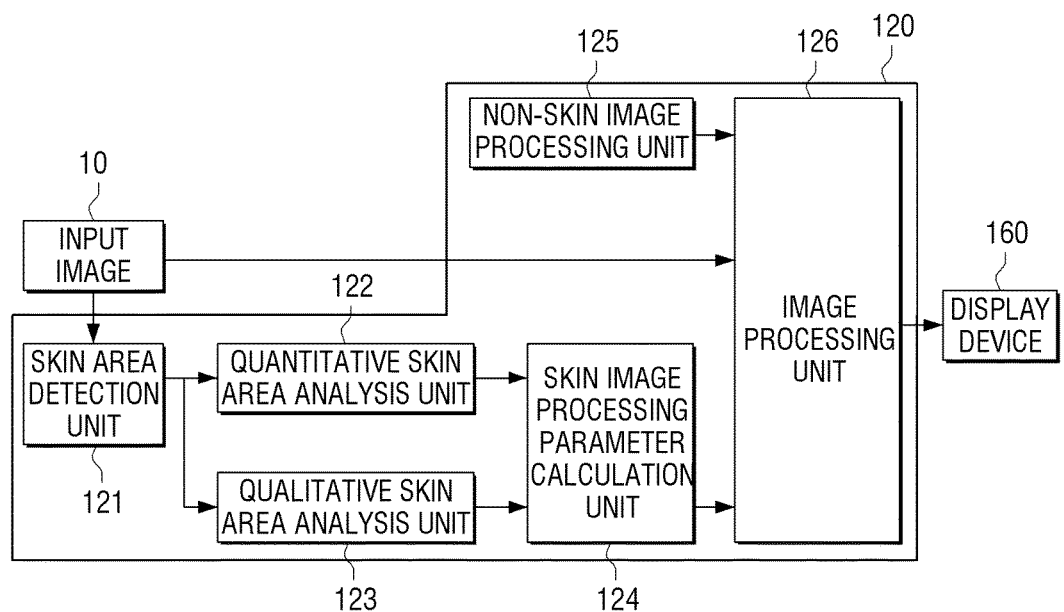
FIG. 3 is a block diagram illustrating an example configuration of a processor according to an example embodiment of the present disclosure.

FIG. 3 is a block diagram illustrating an example configuration of a processor according to an example embodiment of the present disclosure.

Referring to FIG. 3, the processor 120 may include various modules comprising hardware, software, firmware and/or any combinations thereof, including a skin area detection unit 121, a quantitative skin area analysis unit 122, a qualitative skin area analysis unit 123, a skin image processing parameter calculation unit 124, a non-skin image processing unit 125, and an image processing unit 126.

If an input image 10 is input to the electronic apparatus 100, the skin area detection unit 121 may detect the area recognized as the human skin from the input image 10. For example, the input image 10 may also be input to the electronic apparatus 100 through the wired communication scheme or the wireless communication scheme, may be an image pre-stored in the electronic apparatus 100, and may also be input by connecting external memory apparatuses such as an USB and an external hard to the electronic apparatus 100.

For example, when the input image 10 is an image including a background area and a plurality of objects, the skin area detection unit 121 may separate the background area and the plurality of objects from the input image 10 in consideration of continuity of a color, intensity of change of a color, a form of an object, or the like depending on the pixel values included in the background area and each of the plurality of objects.

Further, the skin area detection unit 121 may detect an object corresponding to a human being among the plurality of objects and if the object corresponding to the human being is detected, may detect the area recognized as the human skin.

For example, the skin area detection unit 121 may detect the object determined as a human form by comparing a plurality images (image associated with a human being classified based on a sex, an image associated with a human being classified based on a race, an image associated with a human being classified by country or area, or the like) associated with a human being with the plurality of objects in order to detect objects corresponding to a number of human beings.

Further, the skin area detection unit 121 may detect the skin area by comparing the plurality of images (an image associated with a skin color classified by sex, an image associated with a skin color classified according to a race, an image associated with a skin color classified by country or area, an image associated win a form of a skin, an image associated with a surface state of a skin, or the like) associated with the skin area among the detected objects determined as a form of a human being with an object determined as a form of a human being.

Further, the quantitative skin area analysis unit 122 may acquire the information on the pixel value by analyzing the pixel value of the pixel included in the skin area detected by the skin area detection unit 121, in which the information on the pixel value may include at least one of the color, the saturation, the contrast, the brightness, and the color temperature. The information such as the color, the saturation, the contrast, the brightness, and the color temperature may be digitally represented, which is defined as quantitative information in advance.

For example, the quantitative skin area analysis unit 122 may detect the digitalized information such as a yellow brown color, the saturation of 30, the contrast of 50, the brightness of 70, and the color temperature of 50° C.

Further, the qualitative skin area analysis unit 123 may acquire the information on the characteristics of the skin area detected by the skin area detection unit 121. For example, the face area in the skin area detected by the skin area detection unit 121 may be detected and the information on the characteristics of the skin area may be acquired based on the detected face area.

For example, the information on the characteristics of the skin area may include at least one of the sex, the age, the race, and the area about the skin area. The information such as the sex, the age, the race, and the area about the skin area may not be digitalized, which is defined as the qualitative information in advance.

For example, the qualitative skin area analysis unit 123 may detect at least one of the sex, the age, the race, and the area about the skin area based on at least one object included in the face region in the skin area detected by the skin area detection unit 121.

For example, the process of detecting qualitative information using the qualitative skin area analysis unit 123 will be described with reference to FIG. 5.

Figure 5:
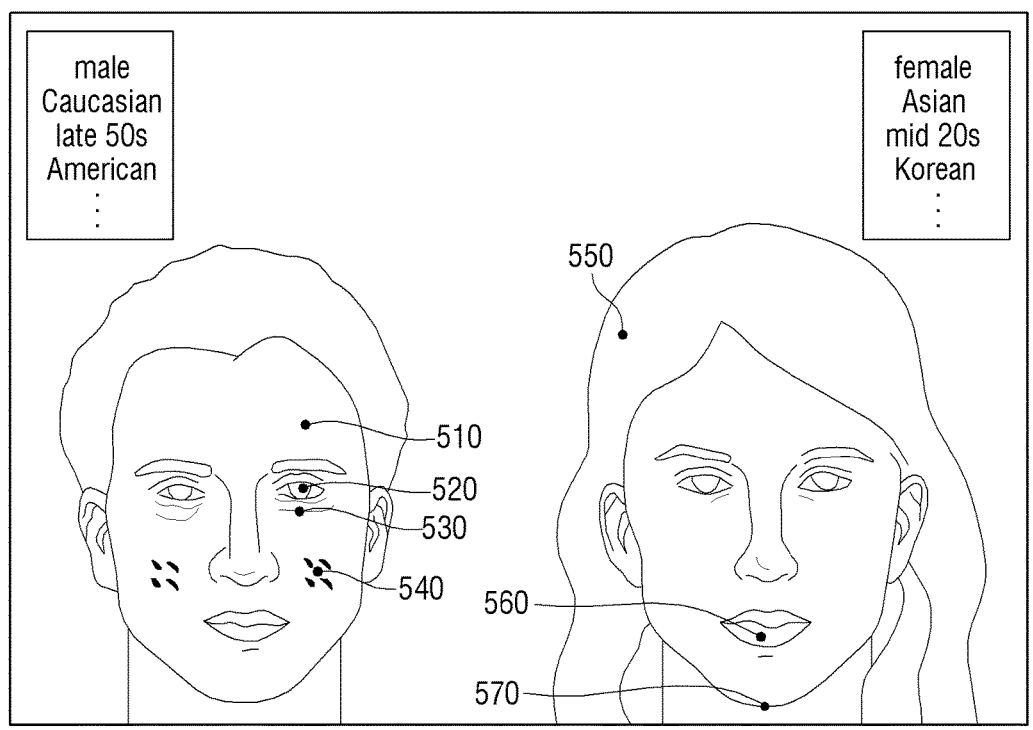
FIG. 5 is a diagram illustrating an example method for detecting qualitative information according to an example embodiment of the present disclosure.

FIG. 5 is a diagram illustrating an example method for detecting qualitative information according to an example embodiment of the present disclosure.

Referring to FIG. 5, the qualitative skin area analysis unit 123 may detect at least one of the sex, the age, the race, and the area about the skin area based on an eye, a nose, a mouth which are included in the face area, or the like, a form of a face, a length of a hair, or the like.

For example, the qualitative skin area analysis unit 123 may detect the sex about the skin area by analyzing elements that may determine a sex such as a length of a hair 550, a shape of a lip 560, and a form of a face 570 that are included in the face area.

Further, the qualitative skin area analysis unit 123 may detect the race about the skin area by analyzing elements that may determine a race, such as a tone of a skin 510 and a color of a pupil 520 that are included in the face area.

Further, the qualitative skin area analysis unit 123 may detect the age about the skin area by analyzing elements that may determine the skin aging such as the number and shape of wrinkles 530, a presence and absence and location 540 of pimples or black spots, or the like that are included in the face area.

Further, the qualitative skin area analysis unit 123 may detect the area about the skin area by analyzing all the elements such as a size and a location of an eye, a nose, and a mouth included in the face area, the overall face form depending on a disposition of an eye, a nose, and a mouth, a hair color, a pupil color, a form, a location, and color of an eyebrow, a form, a location, and a color of a lip.

For example, the qualitative skin area analysis unit 123 may use a database including various images associated with each element to analyze the elements that may determine the sex, the elements that may determine the race, the element that may determine the skin aging, or the like in detecting the sex, the age, the race, and the area about the skin area, in which the database may also be stored in the external server and may also be stored in the storage 130 in the electronic apparatus 100. For example, the qualitative skin area analysis unit 123 may compare and match the foregoing database with the plurality of objects included in the face area to analyze the elements that may determine the sex, the element that may determine the race, the element that may determine the skin aging, or the like.

Therefore, the qualitative skin area analysis unit 123 may detect that the sex is a male in consideration of a length of a hair, a shape of a lip, a shape of a face, or the like that are included in the face area in connection with the face area illustrated at the left of FIG. 5, detect that the race is Caucasian in consideration of the color of a skin, the color of a pupil, or the like that are included in the face area, detect that the age is fifties in consideration of the number, location, and shape of wrinkles, the presence and absence of pimples and black spots, or the like that are included in the face area, detect that the user is an American who resides in the United States of America by referring to at least one of the setting values by area of the electronic apparatus 100, the user information, and the user account information, and detect the information on a general preferred skin color for an image corresponding to the foregoing sex, age, and race based on the fact that the user is an American.

The qualitative skin area analysis unit 123 may detect that the sex is a female in consideration of a length of a hair, a shape of a lip, a shape of a face, or the like that are included in the face area in connection with the face area illustrated at the right of FIG. 5, detect that the race is Asian in consideration of the color of a skin, the color of a pupil, or the like that are included in the face area, detect that the age is twenties in consideration of the number, location, and shape of wrinkles, the presence and absence of pimples and black spots, or the like that are included in the face area, detect that the user is a Korean who resides in Korea by referring to at least one of the setting values by area of the electronic apparatus 100, the user information, and the user account information, and detect the information on a general preferred skin color for an image corresponding to the foregoing sex, age, and race based on the fact that the user is a Korean.

Referring again to FIG. 3, if the information on the pixel value of the pixel included in the skin area that is the quantitative information and the information on the characteristics of the skin area that is the qualitative information are received from the quantitative skin area analysis unit 122 and the qualitative skin area analysis unit 123, the skin image processing parameter calculation unit 124 may determine image processing parameters used to perform the image processing of the skin area of the input image 10. For example, the image processing parameters may refer, for example, to parameters for changing the color, the brightness, the saturation, the contrast, or the like in performing the image processing of the skin area of the input image 10.

Further, an area remaining after the skin area detection unit 121 detects the area recognized as the human skin in the input image 10 may be processed by the non-skin image processing unit 125.

For example, the non-skin image processing unit 125 may determine that compensation processing parameters for an area remaining after the region recognized as the human skin in the input image 10 is detected for the overall harmonization of the input image 10, in consideration of the image processing parameters for the area recognized as the human skin.

Further, the image processing unit 126 may receive the image processing parameters calculated by the skin image processing parameter calculation unit 124 and the compensation processing parameters calculated by the non-skin image processing unit 125 to perform the image processing on the skin area of the input image 10 or the rest region other than the skin area.

Further, the image processing unit 126 may output the input image 10 on which image processing is performed to a display 160.

The process of determining the image processing parameters calculated by the skin image processing parameter calculation unit 124 will be described in greater detail below with reference to FIGS. 6 and 7.

Figure 6:
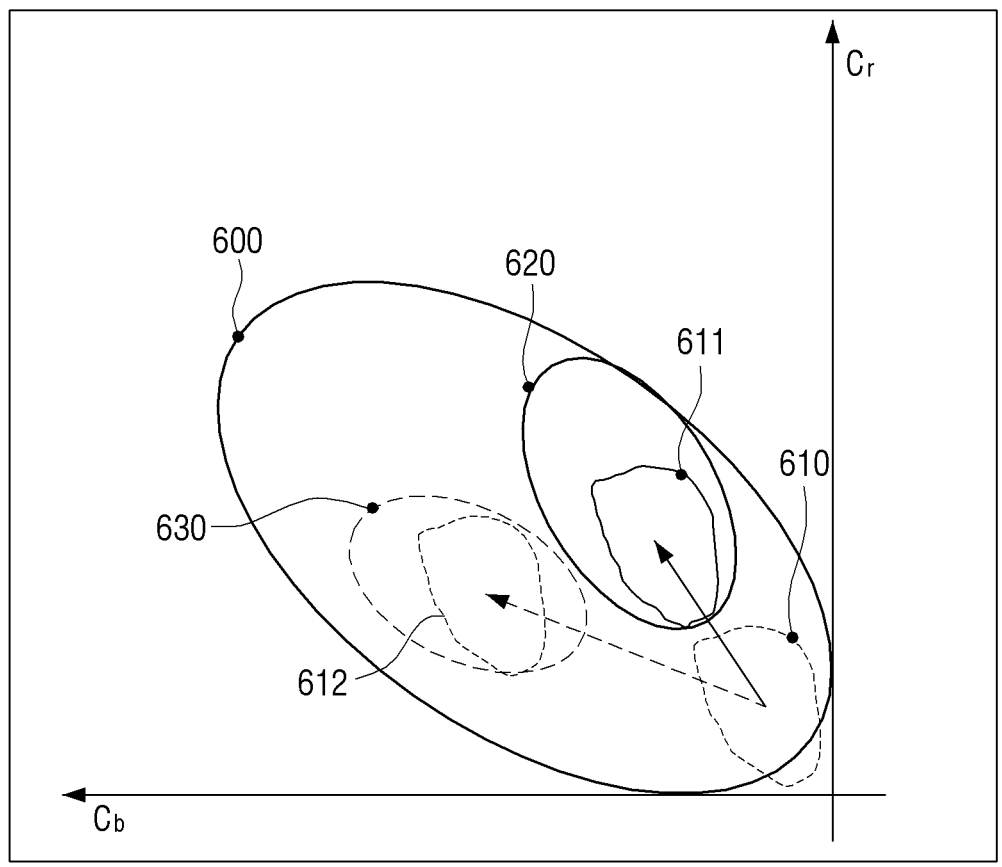
FIGS. 6 and 7 are diagrams illustrating an example process for determining image processing parameters according to an example embodiment of the present disclosure.
Figure 7:
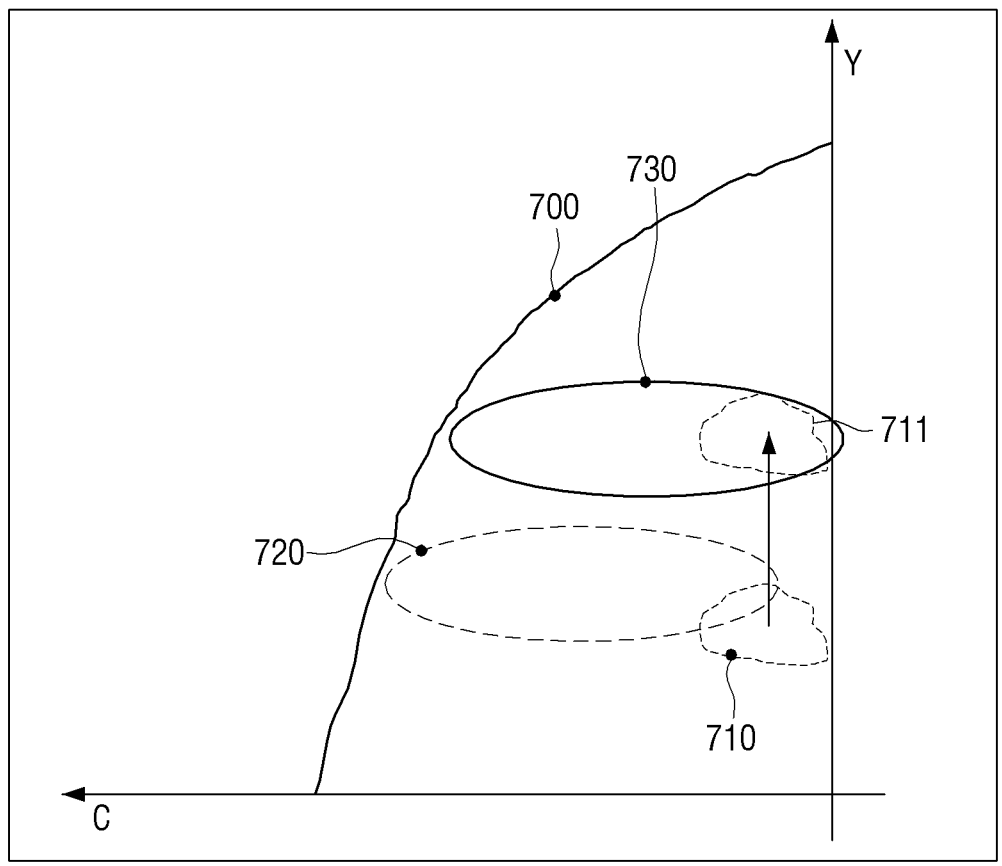

FIGS. 6 and 7 are diagrams illustrating an example process for calculating image processing parameters according to an example embodiment of the present disclosure.

Referring to FIG. 6, a horizontal axis Cb represents a blue-yellow color, a vertical axis Cr represents a red-green color, and the overall area 600 that may be represented by the skin color is illustrated.

Further, a first area 620 represents the set area of the skin color that the sex is a female, the race is Asian, and the age is twenties, depending on the information on the skin color preference of the user and a second region 630 represents the set area of the skin color when the sex is a male, the race is Caucasian, and the age is fifties, depending on the information on the skin color preference of the user.

Further, a third area 610 represents a distribution of YCbCr data of a plurality of pixels configuring the skin area included in the input image 10.

For example, the skin image processing parameter calculation unit 124 may analyze the distribution of the YCbCr data of the third area 610 to derive central coordinates within a YCbCr color space of the skin color of the skin area included in the input image 10.

Further, the skin image processing parameter calculation unit 124 may determine at which location of the overall area 600 that may be represented by the skin color the third area 610 is based on the information (at least one of the sex, the age, the race, and the area) on the characteristics of the skin area that is the qualitative information input from the qualitative skin area analysis unit 123.

For example, the skin image processing parameter calculation unit 124 may determine at which location of the overall area 600 that may be represented by the skin color the central coordinates within the YCbCr color space of the skin color of the skin area included in the input image are.

For example, when the information on the characteristics of the skin area received from the qualitative skin area analysis unit 123 is that the sex is a male, the race is Caucasian, and the age is fifties, central coordinates of the third area 610 may be determined to be included in the second area 630.

Further, the skin image processing parameter calculation unit 124 may calculate the image processing parameters for the pixel value required to move the third area 610 to the determined location, based on the information (at least one of the color, the saturation, the contrast, the brightness, and the color temperature) on the pixel value that is the quantitative information received from the quantitative skin area analysis unit 122.

According to the foregoing example, the skin image processing parameter calculation unit 124 may calculate the image processing parameters like the pixel value required to include the central coordinates of the third area 610 in the second area 630 changes a color to yellow brown, increases the saturation by 10, reduces the contrast by 20, and increases the brightness by 10, based on the current information (color: light brown, saturation: 50, contrast: 60, brightness: 40, or the like) on the pixel value of the third area 610.

Further, the image processing unit 126 may move the central coordinates of the third area 610 to a set location 612 so that the central coordinates are included in the second area 630, based on the image processing parameters calculated by the skin image processing parameter calculation unit 124.

Further, when the information on the characteristics of the skin area received from the qualitative skin area analysis unit 123 is that the sex is a female, the race is Asian, and the age is twenties, the image processing unit 126 may move the central coordinates of the third area 610 to the set location 611 so that the central coordinates are included in the first area 620, based on the image processing parameters calculated by the skin image processing parameter calculation unit 124.

When the image processing is performed in consideration of only the information on the pixel value that is the quantitative information like the existing technologies, for example, the third area 610 cannot move to the first area 620 uniformly. For example, according to the existing technologies, the image processing may be performed by only one method depending on the defined image processing parameters.

However, according to the foregoing example embodiment of the present disclosure, the third area 610 may move to the first area 620 or the second area 630 in consideration of the information on the characteristics of the skin area that is the qualitative information. For example, the processor 120 may determine various image processing parameters depending on the information on the characteristics of the skin area that is the qualitative information, such that the image processing may be performed by various methods.

FIG. 6 illustrates that the horizontal axis Cb represents a blue-yellow color and the vertical axis Cr represents the red-green color to describe only coordinates for a color but the saturation, the contrast, and the brightness may also be adjusted individually.

For example, FIG. 7 illustrates an example of adjusting the brightness, in which the horizontal axis represents the color, the vertical axis represents the brightness, and illustrates an overall area 700 associated with the brightness of the skin color.

Further, a first area 730 represents the set area of brightness of the skin color that the sex is a female, the race is Asian, and the age is twenties, depending on the information on the skin color preference of the user and a second region 720 represents the set area of brightness of the skin color when the sex is a male, the race is Caucasian, and the age is fifties, depending on the information on the skin color preference of the user.

Further, a third area 710 represents a distribution of data on brightness of a plurality of pixels configuring the skin area included in the input image 10.

For example, the skin image processing parameter calculation unit 124 may analyze the distribution of data on the brightness of the third area 710 to derive the central coordinates of the third area 710.

Further, the skin image processing parameter calculation unit 124 may determine at which location of the overall area 700 associated with the brightness of the skin color the third area 710 is based on the information (at least one of the sex, the age, the race, and the area) on the characteristics of the skin area that is the qualitative information input from the qualitative skin area analysis unit 123.

For example, the skin image processing parameter calculation unit 124 may determine at which location of the overall area 700 associated with the brightness of the skin color the central coordinates of the third area 710 are.

For example, when the information on the characteristics of the skin area received from the qualitative skin area analysis unit 123 is that the sex is a female, the race is Asian, and the age is twenties, the skin image processing parameter calculation unit 124 may determine that central coordinates of the third area 710 are included in the first area 730.

Further, the skin image processing parameter calculation unit 124 may calculate the image processing parameters for the pixel value required to move the third area 710 to the determined location, based on the information (at least one of the color, the saturation, the contrast, the brightness, and the color temperature) on the pixel value that is the quantitative information received from the quantitative skin area analysis unit 122.

According to the foregoing example, the skin image processing parameter calculation unit 124 may calculate the image processing parameters like the pixel value required to include the central coordinates of the third area 710 in the first area 730 increases the brightness by 20, based on the current information (color: light brown, saturation: 50, contrast: 60, brightness: 40, or the like) on the pixel value of the third area 710.

Further, the image processing unit 126 may move the central coordinates of the third area 710 to a set location 711 so that the central coordinates are included in the first area 730, based on the image processing parameters calculated by the skin image processing parameter calculation unit 124.

Figure 8:
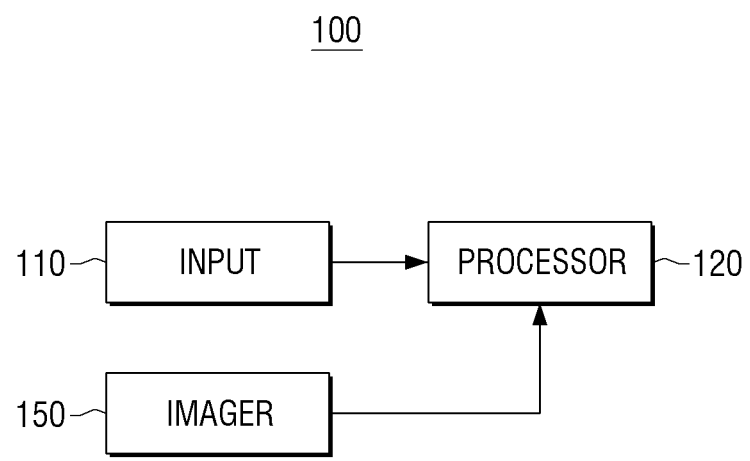
FIG. 8 is a block diagram illustrating an example configuration of an electronic apparatus according to another example embodiment of the present disclosure.

FIG. 8 is a block diagram illustrating an example configuration of an electronic apparatus according to another example embodiment of the present disclosure.

Referring to FIG. 8, the electronic apparatus 100 includes the input 110, the processor 120, and an imager (e.g., including imaging circuitry, such as, for example, and without limitation, a camera) 150.

Here, the input 110 and the processor 120 are already described, and therefore a repeated detailed description thereof will be omitted.

The imager 150 may include various imaging circuitry configured to photograph an image of a user. The imager 150 may be implemented by a camera, an infrared sensor, an operation sensor, or the like, but is not limited thereto.

Further, the processor 120 may acquire the information on the characteristics of the skin area of the user based on the face area of the image of the user, determine the skin color preference of the user based on the information on the characteristics of the skin area of the user, and process the image quality of the skin area included in the image based on the determined preference.

For example, the processor 120 may detect the skin area from the image of the user photographed by the imager 150 and determine the information on at least one of the sex, the age, the race, and the area about the skin area of the user based on the face area of the skin area.

Further, the processor 120 may determine the user preferred skin color based on the determined information on at least one of the sex, the age, the race, and the area about the skin area of the user and process the image quality of the skin area of the input image 10 depending on the determined skin color.

For example, when a user is an Asian male in twenties, the processor 120 may determine that the Asian male in twenties prefers a light skin color of Western female in twenties based on database about the skin color preference, such that it may perform a process to change the skin area of the input image 10 to the light skin color.

For example, the database about the skin color preference may also be stored in the storage 130 but may also be stored in the external server, and the database about the skin color preference may be updated by the continuous collection of the preference information on various skin colors of users.

Figure 9:
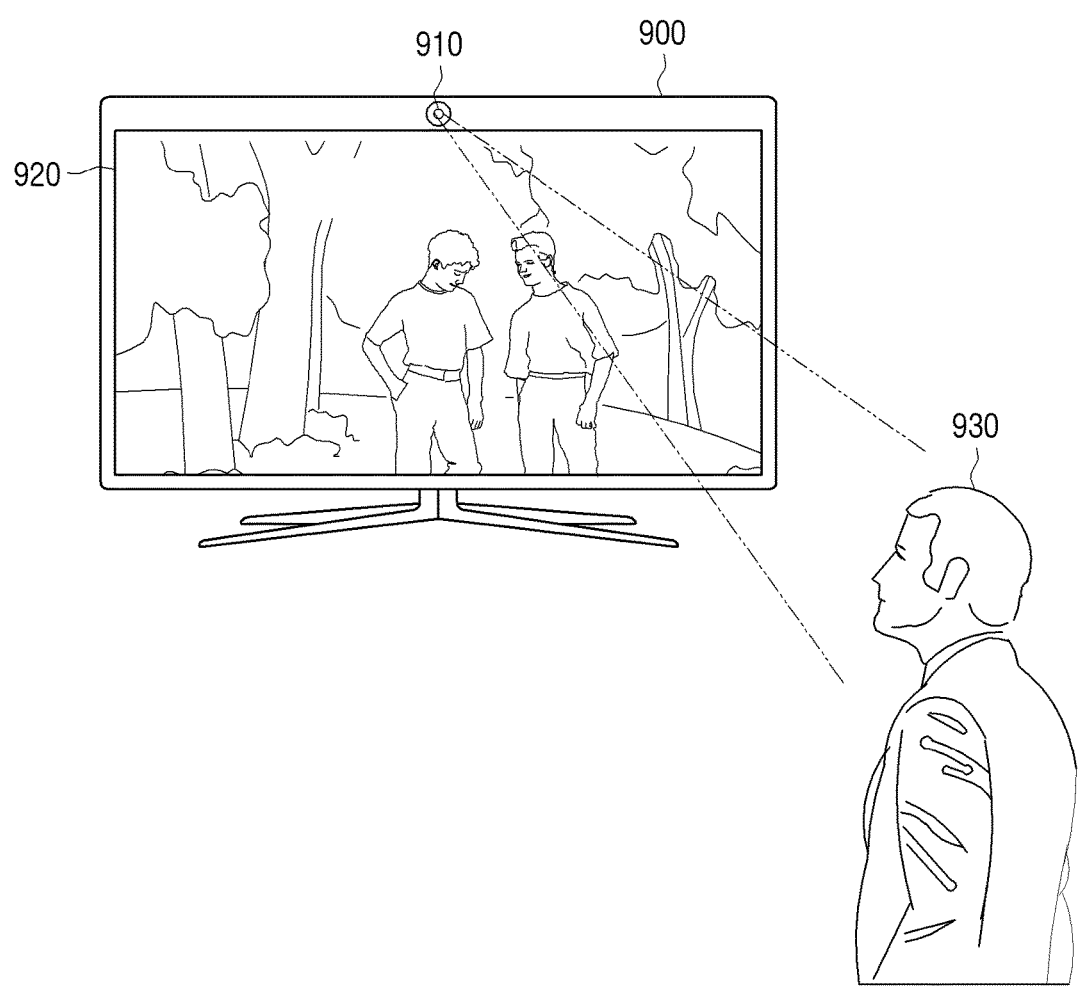
FIG. 9 is a diagram illustrating an example process of performing image processing based on an image of a user according to an example embodiment of the present disclosure.

FIG. 9 is a diagram illustrating an example process of performing image processing based on an image of a user according to an example embodiment of the present disclosure.

Referring to FIG. 9, if an imager 910 photographs an image of a user 930 in the state in which a display apparatus 900 displays an image 920, the processor 120 may determine that a user 930 is a male, teenager, and Asian from the image of the user 930.

Further, the processor 120 may determine that a user is an Asian male in teenager prefers the skin color of the light brown representing a masculine beauty of Western male in twenties based on the database about the skin color preference, and thus the processor may perform a process to change the skin color of Western male included in the displayed image 920 to light brown.

The processor 120 may not perform the image processing on an object, other than a human being, when a displayed image includes an object other than a human being, in addition to the human being.

Figure 10:
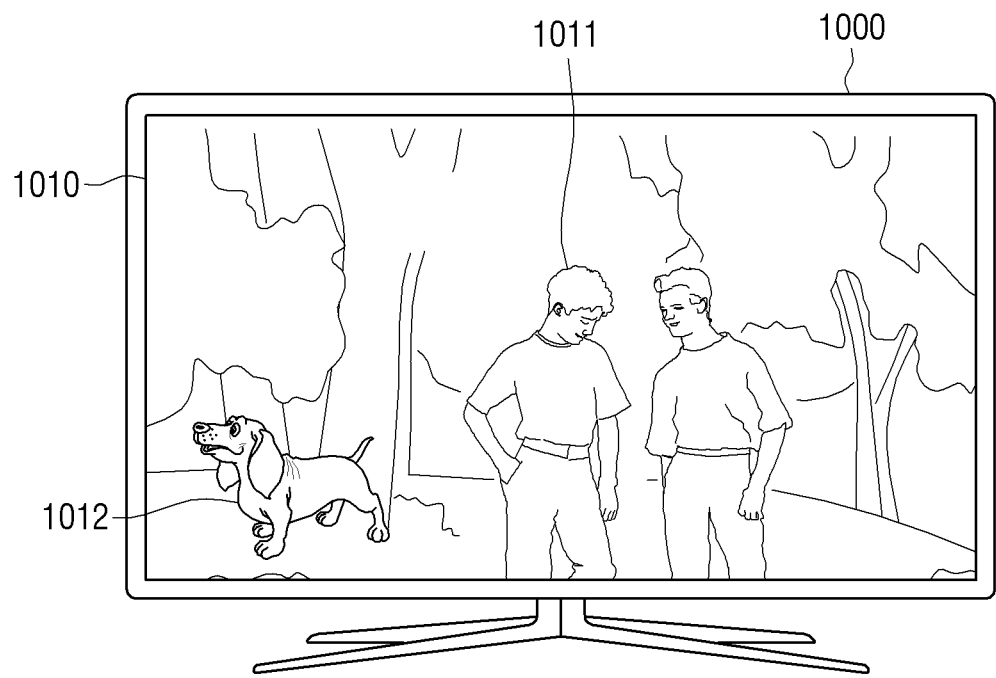
FIG. 10 is a diagram illustrating an example process of performing image processing when an image including an animal besides a human being is displayed according to an example embodiment of the present disclosure.

FIG. 10 is a diagram illustrating an example process of performing image processing when an image including an animal besides a human being is displayed according to an example embodiment of the present disclosure.

Referring to FIG. 10, in the state in which a display apparatus 1000 displays an image 1010 including a human being 1011 and a puppy 1012, the processor 120 may detect only the human being 1011 from the image 1010 based on the database storing various images on a human being and acquire the information on the pixel value and the information on the characteristics of the skin area based on the area corresponding to the human being 1011 and thus may process the image quality of the skin area included in the area corresponding to the human being 1011 based on the acquired information.

Further, the processor 120 may not perform the image processing on the area corresponding to the puppy 1012, which is not the human being.

Figure 11:
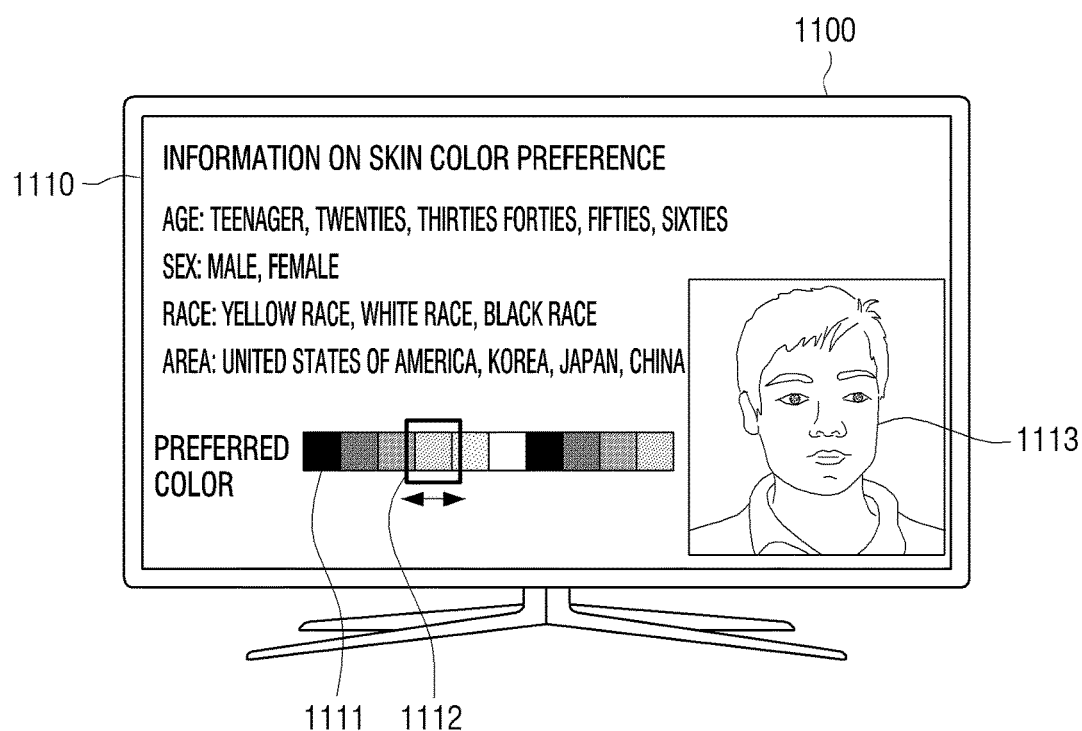
FIG. 11 is a diagram illustrating an example UI for setting skin color preference information according to an example embodiment of the present disclosure.

FIG. 11 is a diagram illustrating an example UI for setting skin color preference information according to an example embodiment of the present disclosure.

Referring to FIG. 11, the display apparatus 1100 may display an UI 1110 that may allow the user to directly set the information on the skin color preference.

For example, the UI 1110 that may set the information on the skin color preference includes items that may set the age, the sex, the race, and the area and includes a color list 1111 including various skin colors that may be selected based on the selected age, sex, race, and area.

The user may move a selection window 1112 in the color list 1111 to select the preferred skin color and the processor 120 may display an image 1113 reflecting the selected skin color and show the user the displayed image 1113.

Therefore, the user may confirm the image 1113 reflecting the selected skin color in real time and store the information on the selected age, sex, race, area, and skin color selected for the information on the skin color preference of the user.

As illustrated in FIG. 11, the case in which the user directly inputs the information on the age, the sex, the race, or the like through the UI 1110 that may set the information on the skin color preference and the case in which the processor 120 automatically determines the age, the sex, the race, or the like of the user and then the user sets the preferred skin color corresponding to the determined age, sex, race, or the like of the user may also be considered.

For example, the processor 120 may analyze the image of the user acquired by the imager 150 to determine the age, the sex, the race, or the like of the user and display the information on the determined age, sex, race, or the like of the user and show the user the displayed information. The user may confirm the age, the sex, the race, or the like of the user that is automatically determined by the processor 120 and then may directly set the preferred skin color by the color list 1111 described in FIG. 11.

Therefore, the processor 120 may match the preferred skin color selected based on the operation of the user with the age, sex, race, or the like of the user determined by analyzing by the image of the user and store it.

For example, when the user is an Asian male in twenties, the processor 120 may analyze the image of the user acquired by the imager 150 to determine that the age is twenties, the sex is a male, and the race is Asian and when the preferred skin color selected according to the user operation is a light beige color, may generate the information on the skin color preference in which the skin color that the Asian male in twenties prefers is matched with the light beige color and store the generated information.

Further, the processor 120 may perform the image processing on the image input later based on the stored information on the skin color preference and may also transmit the stored information on the skin color preference to the server.

Therefore, the server may generate big data about the skin color preference by receiving the information on the skin color that various ages, sexes, and races of users prefer and may also provide a preferred skin color recommendation service for each user, an automatic setting service for the skin color of the electronic apparatus 100 by area, or the like based on the so generated big data.

Figure 12:
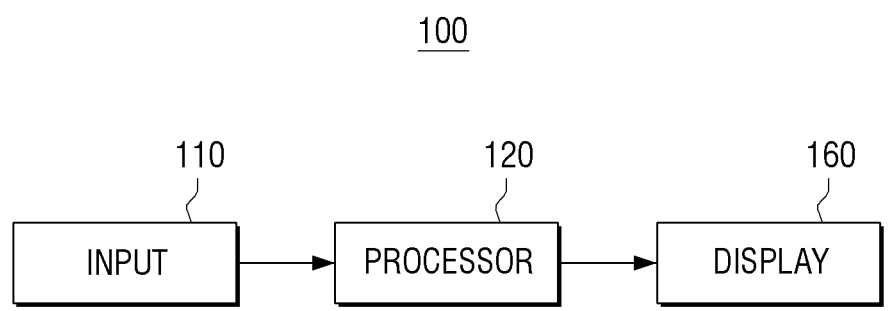
FIG. 12 is a block diagram illustrating an example configuration of an electronic apparatus according to another example embodiment of the present disclosure.

FIG. 12 is a block diagram illustrating an example configuration of the electronic apparatus 100 according to another example embodiment of the present disclosure.

Referring to FIG. 12, the electronic apparatus 100 may include the input 110, the processor 120, and a display 160.

Here, the input 110 and the processor 120 are already described, and therefore a repeated detailed description thereof will be omitted.

The display 160 may display various images and be implemented by a liquid crystal display (LCD), an organic light emitting display (OLED), a plasma display panel (PDP), or the like, but is not limited thereto.

Further, the processor 120 may control the display 160 to display the image in which the image quality of the skin area is processed.

The processor 120 may gradually process the image quality of the skin area for a plurality of preset frame intervals.

For example, the processor 120 may gradually perform the image processing for five frame intervals when the image processing parameters correspond to the case in which a color is yellow brown, the saturation is increased by 20, the contrast is increased by 10, and the brightness is reduced by 20. For example, the color may be changed to the yellow brown, the saturation may be increased by 4, the contrast may be increased by 2, and the brightness may be reduced by 4, for each of the five frame intervals.

Therefore, the processor 120 may naturally change the skin color in the played image.

Figure 13:
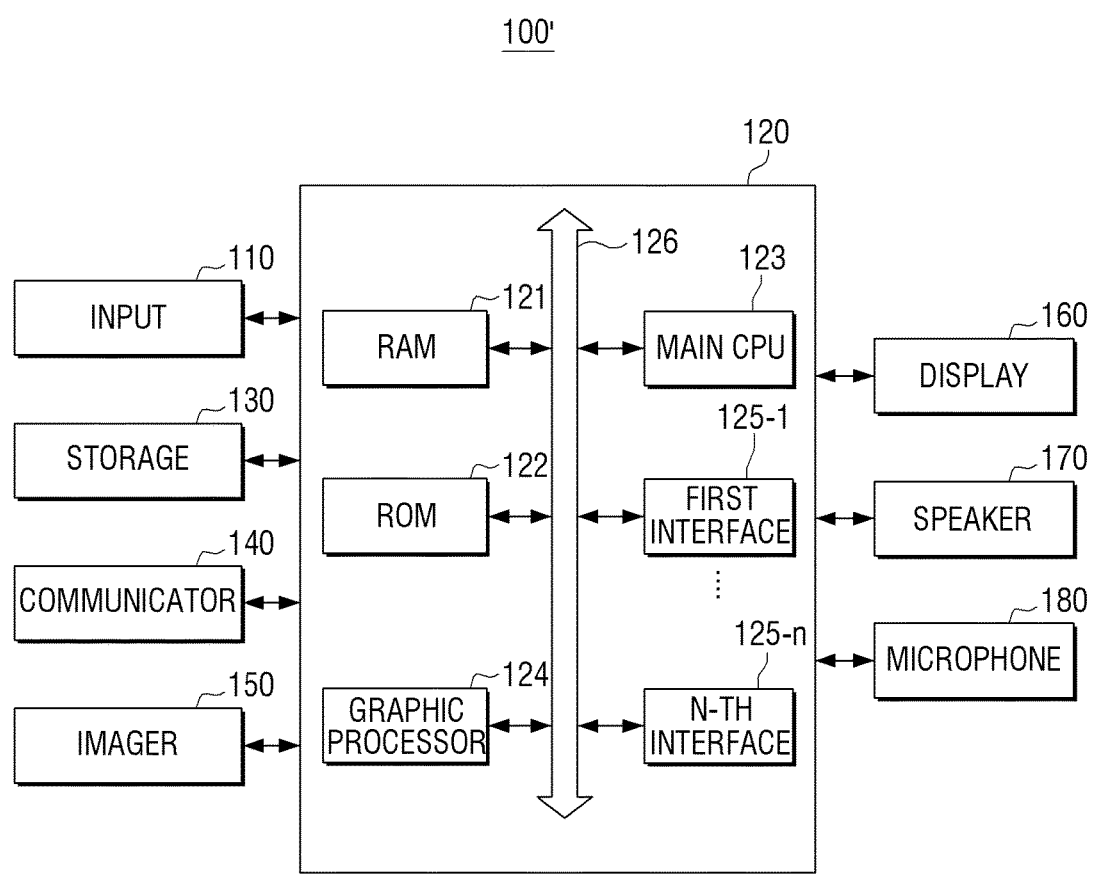
FIG. 13 is a block diagram illustrating an example configuration of the electronic apparatus illustrated in FIG. 1.

FIG. 13 is a block diagram illustrating an example configuration of the electronic apparatus illustrated in FIG. 1.

Referring to FIG. 13, an electronic apparatus 100' includes the input (e.g., including input circuitry) 110, the processor (e.g., including processing circuitry) 120, the storage 130, the communicator (e.g., including communication circuitry) 140, the imager (e.g., including imaging circuitry) 150, the display 160, a speaker 170, and a microphone 180. The detailed description of the components previously described among the components illustrated in FIG. 13 will be omitted.

The processor 120 includes various processing circuitry and controls a general operation of the electronic apparatus 100'.

For example, the processor 120 includes an RAM 121, an ROM 122, a main CPU 123, a graphic processor 124, first to n-th interfaces 125-1 to 125-n, and a bus 126.

The RAM 121, the ROM 122, the main CPU 123, the graphic processor 124, the first to n-th interfaces 125-1 to 125-n, and the like may be connected to each other via the bus 126.

The first to n-th interfaces 125-1 to 125-n are connected to the foregoing various components. One of the interfaces may be a network interface which is connected to the external devices through a network.

The main CPU 123 accesses the storage 110 to perform booting using the O/S stored in the storage 110. Further, the main CPU 133 executes various operations using various programs, contents, data, and the like which are stored in the storage 110.

For example, the CPU 123 may detect the skin area from the input image 10 to acquire the information on the pixel value of the pixel included in the skin area and acquire the information on the characteristics of the skin area based on the face area in the skin area.

The ROM 122 stores a set of instructions for system booting. When a turn on instruction is input to supply power, the main CPU 123 copies an O/S stored in the storage 110 to the RAM 121 according to the instruction stored in the ROM 121 and executes the O/S to boot the system. If the booting is completed, the main CPU 123 copies various application programs stored in the storage 110 to the RAM 121 and executes the application programs copied to the RAM 121, thereby performing various operations.

The graphic processor 124 uses an operator (not illustrated) and a renderer (not illustrated) to generate a screen including various objects such as an icon, an image, and a text. The operator (not illustrated) operates attribute values, such as coordinate values at which each object will be represented, forms, sizes, and colors according to a layout of the screen, based on the received control instruction. The renderer (not illustrated) creates screens of various layouts including the objects based on the attribute values which are operated by the operator (not illustrated).

For example, the graphic processor 124 may process the image quality of the skin area based on the information on the pixel value acquired by the main CPU 123 and the information on the characteristics of the skin area.

The foregoing operation of the processor 120 may be executed by programs which are stored in the storage 130.

The storage 130 stores various data such as an operating system (O/S) software module for driving the electronic apparatus 100', and various data like various kinds of multimedia contents.

For example, the storage 130 may include a software module that serves to detect the skin area from the input image 10, acquire the information on the pixel value of the pixel included in the skin area, acquire the information on the characteristics of the skin area based on the face area in the skin area, and process the image quality of the skin area based on the information on the pixel value and the information on the characteristics of the skin area.

The speaker 170 may be used to output a sound signal based on an audio signal included in the received broadcast signal. Further, the speaker may be used to output the corresponding sound signal when the stored music file and image file are played.

The microphone 180 may be used to receive a utterance voice of a user. The microphone may receive the information on the preferred skin color that the user utters and the processor 120 may store the received information or perform the image processing of the skin area of the input image 10 based on the received information.

Figure 14:
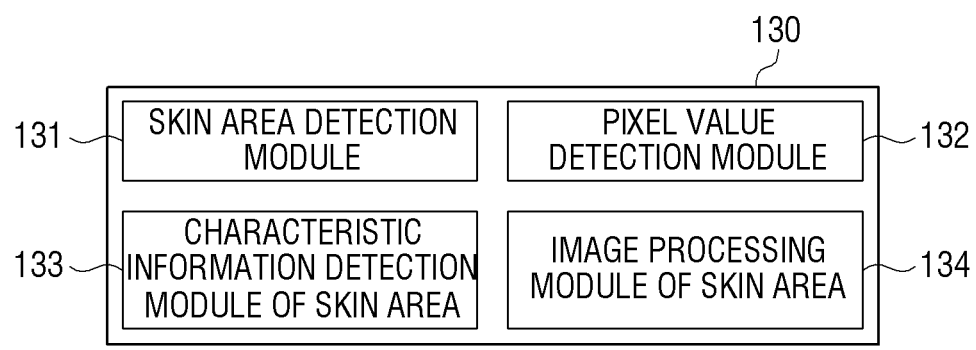
FIG. 14 is a diagram illustrating an example software module stored in a storage according to an example embodiment of the present disclosure.

FIG. 14 is a diagram illustrating an example software module stored in a storage according to an example embodiment of the present disclosure.

Referring to FIG. 14, the storage 130 store various programs such as a skin area detection module 131, a pixel value detection module 132, a characteristic information detection module of the skin area 133, and an image processing module of the skin area 134.

The foregoing operation of the processor 120 may be executed by programs which are stored in the storage 130. Hereinafter, the detailed operation of the processor 120 using the programs stored in the storage 130 will be described in greater detail below.

The skin area detection module 131 may serve to detect the skin area from the input image 10 based on the database in which the image associated with the human skin area is stored.

Further, the pixel value detection module 132 may serve to analyze the pixel value of the pixel included in the detected skin area to detect the information on at least one of the color, the saturation, the contrast, the brightness, and the color temperature.

Further, the characteristic information detection module of the skin area 133 may serve to detect the information on at least one of the sex, the age, the race, and the area of the skin area based on the face area in the skin area detected based on the database storing various images that are divided based on the sex, the age, the race, the area, or the like about the skin area.

Further, the image processing module of the skin area 134 may serve to process the image quality of the skin area of the input image 10 based on the information on the pixel value and the information on the characteristics of the skin area that are detected by the pixel value detection module 132 and the characteristic information detection module 132 of the skin area, respectively.

FIG. 15 is a flowchart illustrating an example method of controlling an electronic apparatus according to an example embodiment of the present disclosure.

The method of controlling the electronic apparatus illustrated in FIG. 15 detects the skin area from the input image (S1510).

Further, the information on the pixel value of the pixel included in the skin area is acquired (S1520).

Further, the information on the characteristics of the skin area is acquired based on the face area in the skin area (S1530).

The image quality of the skin area is processed based on the information on the pixel value and the information on the characteristics of the skin area (S1540).

For example, the information on the characteristics of the skin area may include the information on at least one of the sex, the age, the race, and the area about the skin area.

Further, the information on the pixel value may include the information on at least one of color, saturation, contrast, brightness, and color temperature.

Further, in the processing of the image quality of the skin area, the skin color corresponding to the information on the characteristics of the skin area among the pre-stored skin color preference of the user may be determined and the image quality of the skin area may be processed depending on the determined skin color.

The method of controlling the electronic apparatus according to an example embodiment of the present disclosure may further include receiving the information on the skin color preference of the user from the external server.

Further, in the acquiring of the information on the characteristics of the skin area, at least one of the sex, the age, the race, and the area about the skin area based on at least one object included in the face area in the skin area may be detected.

Further, the method of controlling the electronic apparatus may further include photographing the image of the user, acquiring the information on the characteristics of the skin area of the user based on the face area in the image of the user, determining the skin color preference of the user based on the information on the characteristics of the skin area of the user, and processing the image quality of the skin area included in the image based on the determined preference.

Further, in the processing of the image quality of the skin area, the image quality of the skin area may be gradually processed for the plurality of preset frame intervals.

Further, the controlling method of the electronic apparatus may further include displaying the image in which the image quality of the skin area is processed.

A non-transitory computer readable medium in which a program sequentially performing the controlling method according to the present disclosure is stored may be provided.

The non-transitory computer readable medium may refer, for example, to a medium that semi-permanently stores data therein and is readable by a device. For example, various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like, but is not limited thereto.

In addition, although buses are not illustrated in the block diagram of the electronic apparatus, communication between the respective components in the electronic apparatus may be performed through the buses. In addition, a processor such as a dedicated processor, a central processing unit (CPU), a microprocessor, or the like, performing various processes described above may be further included in each device.

Although various example embodiments of the present disclosure have been illustrated and described hereinabove, the present disclosure is not limited to the above-mentioned example embodiments, but may be variously modified by those skilled in the art to which the present disclosure pertains without departing from the scope and spirit of the disclosure as set forth in the accompanying claims. These modifications should also be understood to fall within the scope of the present disclosure.

What is claimed is:

1. An electronic apparatus, comprising:
   an input unit comprising input circuitry configured to receive an image; and
   a processor configured to:
   detect at least one skin area among a plurality of areas of the image based on a color of the image,
   obtain first information on a pixel value of the at least one skin area;
   detect a face area among the at least one skin area based on a shape of the at least one skin area,
   obtain second information on characteristics of the at least one skin area based on a shape of at least one object included in the face area;
   identify a preference skin color corresponding to information combining the first and second information, and
   change a color of the at least one skin area to the identified preference skin color by adjusting the pixel value of the at least one skin area,
   wherein the second information on the characteristics of the at least one skin area includes information on at least one of a sex and age, and
   wherein the processor is configured to further identify the preference skin color based on at least one of the sex and the age.

2. The electronic apparatus as claimed in claim 1, wherein the first information on the pixel value includes information on at least one of: color, saturation, contrast, brightness, and color temperature.

3. The electronic apparatus as claimed in claim 1, further comprising:
   a memory configured to store information on a plurality of preference skin colors of a user,
   wherein the processor is configured to identify a skin color corresponding to the information on the characteristics of the skin area among the plurality of preference skin colors and to change the skin area based on the identified skin color.

4. The electronic apparatus as claimed in claim 3, further comprising:
   a communicator configured to perform communication with an external server,
   wherein the processor is configured to control the communicator to receive the information on the plurality of preference skin colors of the user from the external server.

5. The electronic apparatus as claimed in claim 1, wherein the processor is configured to detect at least one of: a sex, an age, a race, and an area about the at least one skin area, based on at least one object included in the face area in the at least one skin area.

6. The electronic apparatus as claimed in claim 1, further comprising:
an imager configured to photograph an image of a user, wherein the processor is configured to,
obtain information on the characteristics of the skin area of the user based on a face area of the image of the user,
determine preference skin color of the user based on the information on the characteristics of the skin area of the user, and
process an image quality of the at least one skin area included in the received image based on the determined preference skin color.

7. The electronic apparatus as claimed in claim 1, wherein the processor is configured to gradually change the color of the at least one skin area to the identified preference skin color by adjusting the pixel value of the at least one skin area over a plurality of frames.

8. The electronic apparatus as claimed in claim 1, further comprising:
a display,
wherein the processor is configured to control the display to display an image in which an image quality of the at least one skin area is processed.

9. A method of controlling an electronic apparatus, comprising:
receiving an image;
detecting at least one skin area among a plurality of areas of the image based on a color of the image;
obtaining first information on a pixel value of the at least one skin area;
detecting a face area among the at least one skin area based on a shape of the at least one skin area;
obtaining second information on characteristics of the at least skin area based on a shape of at least one object included in the face area;
identifying a preference skin color corresponding to information combining the first and second information; and
changing a color of the at least one skin area to the identified preference skin color by adjusting the pixel value of the at least one skin area,
wherein the second information on the characteristics of the at least one skin area includes information on at least one of a sex and an age, and
wherein the identifying comprises further identifying the preference skin color based on at least one of the sex and the age.

10. The method as claimed in claim 9, wherein the first information on the pixel value includes information on at least one of: color, saturation, contrast, brightness, and color temperature.

11. The method as claimed in claim 9, wherein in the changing the color of the at least one skin area to the identified preference skin color, a skin color corresponding to the information on the characteristics of the skin area among a plurality of preference skin colors of a user is identified and the change is processed based on the identified skin color.

12. The method as claimed in claim 11, further comprising:
receiving the information on the preference skin color of the user from an external server.

13. The method as claimed in claim 9, wherein in the obtaining of the second information on the characteristics of the at least one skin area, at least one of: a sex, an age, a race, and an area about the at least one skin area is detected based on at least one object included in the face area in the at least one skin area.

14. The method as claimed in claim 9, further comprising:
photographing an image of a user;
obtaining information on the characteristics of the skin area of the user based on a face area in the image of the user;
determining preference skin color of the user based on the information on the characteristics of the skin area of the user; and
processing an image quality of the at least one skin area included in the received image based on the determined preference skin color.

15. The method as claimed in claim 9, wherein in the changing comprises changing the color of the at least one skin area to the identified preference skin color by adjusting the pixel value of the at least one skin area over a plurality of frames.

16. The method as claimed in claim 9, further comprising:
displaying an image in which an image quality of the at least one skin area is processed.

* * * * *